US007984022B2

(12) United States Patent
Cannon et al.

(10) Patent No.: US 7,984,022 B2
(45) Date of Patent: Jul. 19, 2011

(54) SPACE RECOVERY WITH STORAGE MANAGEMENT COUPLED WITH A DEDUPLICATING STORAGE SYSTEM

(75) Inventors: David Maxwell Cannon, Tucson, AZ (US); Mark Andrew Smith, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 12/105,892

(22) Filed: Apr. 18, 2008

(65) Prior Publication Data

US 2009/0265399 A1   Oct. 22, 2009

(51) Int. Cl.
*G06F 7/00* (2006.01)
*G06F 17/00* (2006.01)

(52) U.S. Cl. ......... 707/664; 707/692; 707/693; 707/681

(58) Field of Classification Search .................. None
See application file for complete search history.

(56) References Cited

U.S. PATENT DOCUMENTS

| 7,631,155 | B1* | 12/2009 | Bono et al. ............... | 711/156 |
| 7,747,584 | B1* | 6/2010 | Jernigan, IV ............. | 707/692 |
| 2001/0044856 | A1 | 11/2001 | Agesen et al. | |
| 2004/0153458 | A1 | 8/2004 | Noble et al. | |
| 2005/0065986 | A1* | 3/2005 | Bixby et al. ............... | 707/204 |

OTHER PUBLICATIONS

Christopher Hertel, Implementing CIFS, 2004, Preintice-Hall, http://www.ubiqx.org/cifs/SMB.html#SMB.5.*
U.S. patent application entitled "Sequential Media Reclamation and Replication", U.S. Appl. No. 11/690,983, filed Mar. 26, 2007, by inventors D.M. Cannon and M.A. Kaczmarski.
"Sparse File", Wikipedia, [online][retrieved Feb. 19, 2008] http://en.wikipedia.org/wiki/Sparse_file.
"Sparse Files", Microsoft Corporation, 2008, [online][retrieved Feb. 19, 2008] http://msdn2.microsoft.com/en-us/library/aa365564(VS.85,printer).a....

* cited by examiner

*Primary Examiner* — Kuen S Lu
*Assistant Examiner* — Jason Liao
(74) *Attorney, Agent, or Firm* — Janaki K. Davda; Konrad Raynes and Victor LLP (57) ABSTRACT

Provided are techniques for space recovery with storage management coupled with a deduplicating storage system. A notification is received that one or more data objects have been logically deleted by deleting metadata about the one or more data objects, wherein the notification provides storage locations within one or more logical storage volumes corresponding to the deleted one or more data objects, wherein each of the one or more data objects are divided into one or more extents. In response to determining that a sparse file represents the one or more logical storage volumes, physical space is deallocated by nulling out space in the sparse file corresponding to each of the one or more extents.

19 Claims, 10 Drawing Sheets

SPACE RECOVERY WITH STORAGE MANAGEMENT COUPLED WITH A DEDUPLICATING STORAGE SYSTEM

BACKGROUND

1. Field

Embodiments of the invention relate to space recovery with storage management coupled with a deduplicating storage system.

2. Description of the Related Art

A storage-management server provides a repository for computer information that is backed up, archived, or migrated from client nodes in a computer network. A storage-management server stores data objects in one or more storage pools in a repository and uses a database for tracking metadata about the stored data objects. Stored data objects may be deleted from the storage-management server based on retention rules or by manual administrative action. When the storage-management server deletes a data object from the repository, metadata pertaining to that data object is deleted from the database. This constitutes logical deletion of the data object because the data is not readily accessible without the corresponding metadata.

After data objects have been logically deleted, the storage-management server may perform a reclamation operation to recover space from aggregates of data objects or from sequential-access volumes on which the data objects are stored. This reclamation operation is typically done by copying remaining data objects from one storage location to another, thereby consolidating the data.

Deduplication describes a scenario in which common data is reduced to a single copy and redundant copies are replaced with references (e.g., pointers) to the original copy. In a typical configuration, a disk-based deduplicating storage system, such as a disk array or a Virtual Tape Library (VTL), has the capability to detect redundant data extents and reduce duplication by avoiding the redundant storage of such extents.

For example, the deduplicating storage system may divide file A into extents a-h, detect that extents b and e are redundant, and store the redundant extents only once. The redundancy could occur within file A or with other files stored in the deduplicating storage system. As another example, deduplicating storage system may store a first file with extents (also known as chunks) x-z. The deduplicating storage system may then divide a second file into extents a-h and determine that extents b and e are the same as extents y and z in the first file (i.e., extents b and e are redundant). Then, the deduplicating storage system does not store extents b and e again. Instead, the deduplicating storage system stores the second file with a list of extents comprising the file, including references for extents b and e to corresponding extents y and z. Thus, with deduplication, redundant extents are stored once.

Various technologies have been adopted for deduplicating data objects. Deduplication may be performed as data objects are ingested by the storage-management server or after ingestion. Ingestion may be described as occurring when the storage-management server receives data objects from a client, stores those data objects in its repository, and inserts metadata about the data objects into the database.

Some systems combine a storage-management server with a deduplicating storage system. Typically, the storage-management functions are decoupled from physical data storage and deduplication. This introduces the need for two levels of space recovery: 1) logical space recovery and 2) physical space recovery.

1. Logical space recovery may be required after data objects are deleted by the storage-management server, especially if the data objects are stored sequentially within aggregates or sequential-access volumes. An aggregate may be described as a collection of two or more data objects stored sequentially and treated as a single entity for efficiency. For example, it is typically more efficient to move an entire aggregate as a unit rather than individually moving each data object in the aggregate.

2. Physical space recovery may be required as the deduplicating storage system detects duplicate extents and attempts to free the space occupied by those extents.

The two levels of space recovery may interact, causing the storage-management server and deduplicating storage system to work against each other.

1. Physical space recovery by the deduplicating storage system can invalidate references to data object storage locations as tracked by the storage-management server. This can be especially problematic if deduplication is performed after data ingest because it forces massive updates in the storage-management server database.

2. Reclamation by the storage-management server to recover space occupied by deleted data objects within aggregates or sequential-access volumes can force the deduplicating storage system to redrive deduplication operations (i.e., perform the deduplication operations again), which can be very costly in terms of computing resources. This can occur because movement of data by the reclamation operation on the storage-management server invalidates the extent information maintained by the deduplicating storage system and forces that system to repeat redundancy checking of the data at the new storage location.

The challenge is to manage storage efficiently to recover space from deleted extents whether those extents are deleted via deduplication or as a result of logical deletion of data objects.

Existing solutions have one or more of the following disadvantages:

1. Logical reclamation by the storage-management server requires physical data movement.

2. Logical reclamation by the storage-management server not only consumes computing resources for that operation, but can also cause the deduplicating storage system to redrive deduplication, which consumes additional resources.

3. Physical recovery of space occupied by deduplicate extents in the deduplicating storage system can invalidate storage location references in the storage-management system, forcing updates to those references Thus, there is a need for improved space recovery for storage management coupled with a deduplicating storage system.

SUMMARY OF EMBODIMENTS OF THE INVENTION

Provided are a method, computer program product, and system for storage management coupled with a deduplicating storage system. A notification is received that one or more data objects have been logically deleted by deleting metadata about the one or more data objects, wherein the notification provides storage locations within one or more logical storage volumes corresponding to the deleted one or more data objects, wherein each of the one or more data objects are divided into one or more extents. In response to determining that a sparse file represents the one or more logical storage volumes, physical space is deallocated by nulling out space in the sparse file corresponding to each of the one or more extents.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
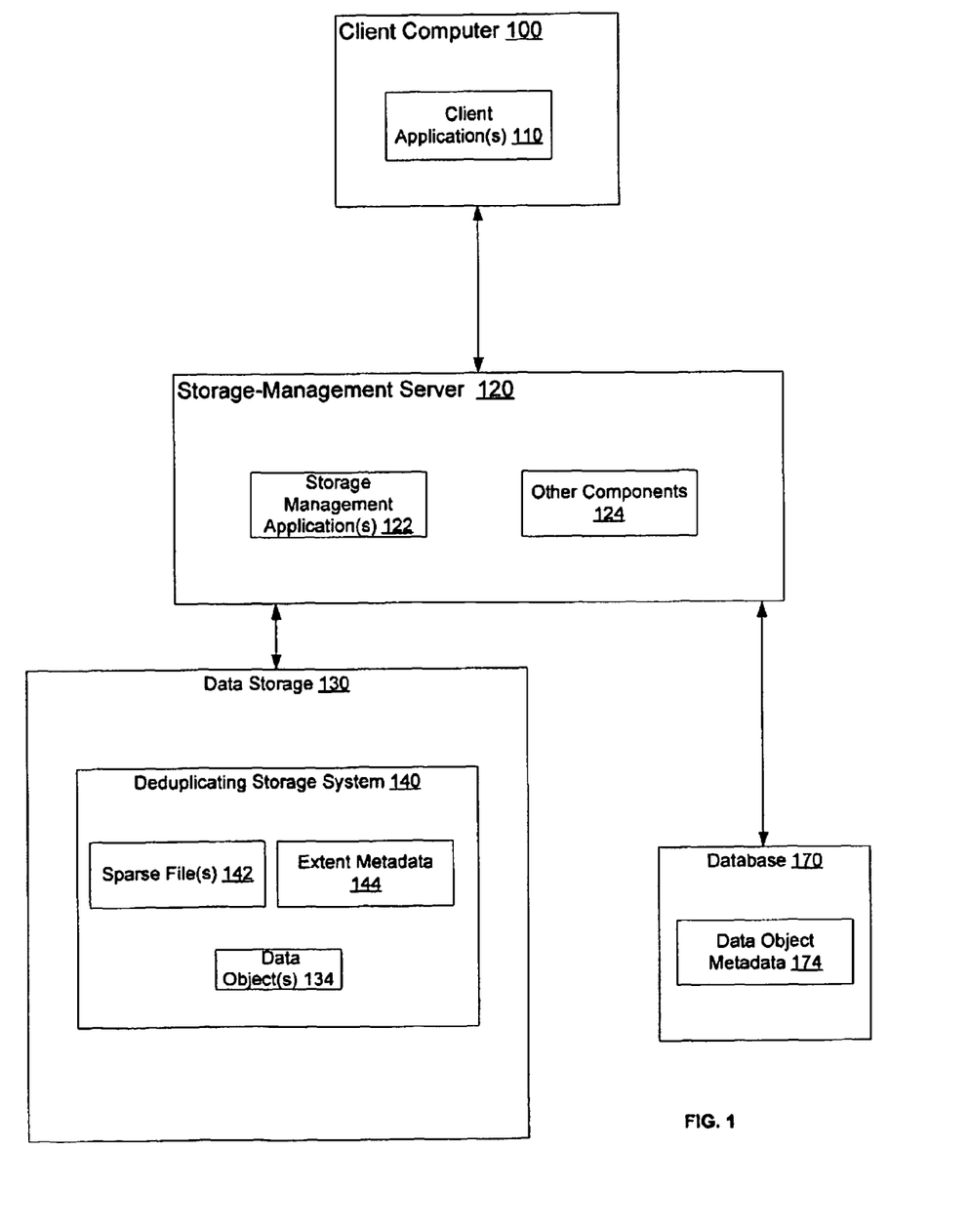
FIG. 1 illustrates details of a computing environment in accordance with certain embodiments.

FIG. 1 illustrates details of a computing environment in accordance with certain embodiments. A client computer 100 is connected ("coupled") via a communication path to a storage-management server 120. The client computer 100 includes one or more client applications 110.

The storage-management server 120 is coupled to data storage 130 and to database 170 via communication paths. The storage-management server 120 includes one or more storage management applications 122 and may include other components 124. The data storage 130 includes a deduplicating storage system 140 and different types of storage (not shown), such as magnetic tape, optical storage devices, and disk. One or more data objects 134 are stored in the various types of storage (e.g., some data objects 134 may be stored on magnetic tape while other data objects 134 are stored on disk). In certain embodiments, the deduplicating storage system 140 includes one or more sparse files 142 and extent metadata 144. In such embodiments, a sparse file 142 represents a logical storage volume that stores data objects 134. A data object 134 may be subdivided into extents during deduplication. In certain alternative embodiments, there is one file 142 for each extent.

The database 170 stores data object metadata 174 about the stored data objects 134. Data object metadata 174 may also be referred to herein as "metadata", "metadata about data objects", or similar terms.

The client computer 100 and storage-management server 120 may comprise any computing device known in the art, such as a server, mainframe, workstation, personal computer, hand held computer, laptop telephony device, network appliance, etc.

The communication path may comprise, for example, any type of network, such as, a peer-to-peer network, spoke and hub network, Storage Area Network (SAN), a Local Area Network (LAN), Wide Area Network (WAN), the Internet, an Intranet, etc.

In certain embodiments, the data storage 130 may comprise a data storage hierarchy. In certain embodiments, the data storage 130 may comprise magnetic tape, optical storage devices, disk, an array of storage devices, such as Direct Access Storage Devices (DASDs), Just a Bunch of Disks (JBOD), Redundant Array of Independent Disks (RAID), virtualization device, etc.

With embodiments, the deduplicating storage system 140 uses sparse files 142 to represent logical storage volumes (e.g., sequential-access disk volumes known to the storage-management server 120). When a data object 134 is deleted, the storage-management server 120 notifies the deduplicating storage system 140 of the storage locations occupied by the deleted data objects in one or more logical storage volumes. Upon receiving this notification, the deduplicating storage system 140 dereferences corresponding extents and reclaims physical space by nulling out physical space occupied by extents that are no longer needed. This allows the deduplicating storage system 140 to recover space occupied by unused extents without moving data or forcing updates to the storage location information tracked by the storage-management server 120.

In alternate embodiments, the deduplicating storage system 140 stores each extent as a distinct file, which is deleted by the deduplicating storage system once all references to that extent have been removed (i.e., a reference count associated with the extent is zero, which indicates that no extents (including the extent itself) reference this one).

In certain embodiments, the deduplicating storage system 140 uses sparse files to represent logical storage volumes as known to the storage-management server 120. Storage locations within logical storage volumes of the storage-management server 120 that are no longer needed are communicated to the deduplicating storage system 140, and the corresponding unused storage locations are nulled out to recover space in the storage system 140. Because the files are sparse, the offset location for data objects that are still valid is preserved and database 170 updates are not required to record the new location of the valid data objects. In addition, since sparse files require less space, their use reclaims space as if the remaining data objects on the logical storage volume were copied to a new volume or file. Performing reclamation involves identifying the storage locations (offsets and lengths) of the volume that are no longer needed. This information is then used to create "holes" in the volume (file) by nulling out the storage locations that are no longer in use, so that just the needed portions are stored. Logically, the volume (file) size stays the same but utilizes less physical disk space. The offsets and lengths of the remaining needed data objects are not changed, so database 170 updates are not needed to record new locations. In addition, reclaimed data objects remain on the same logical storage volume (which is stored as a file) and do not have to be copied to a new logical storage volume so, again, database 170 updates are not required.

Figure 2A:
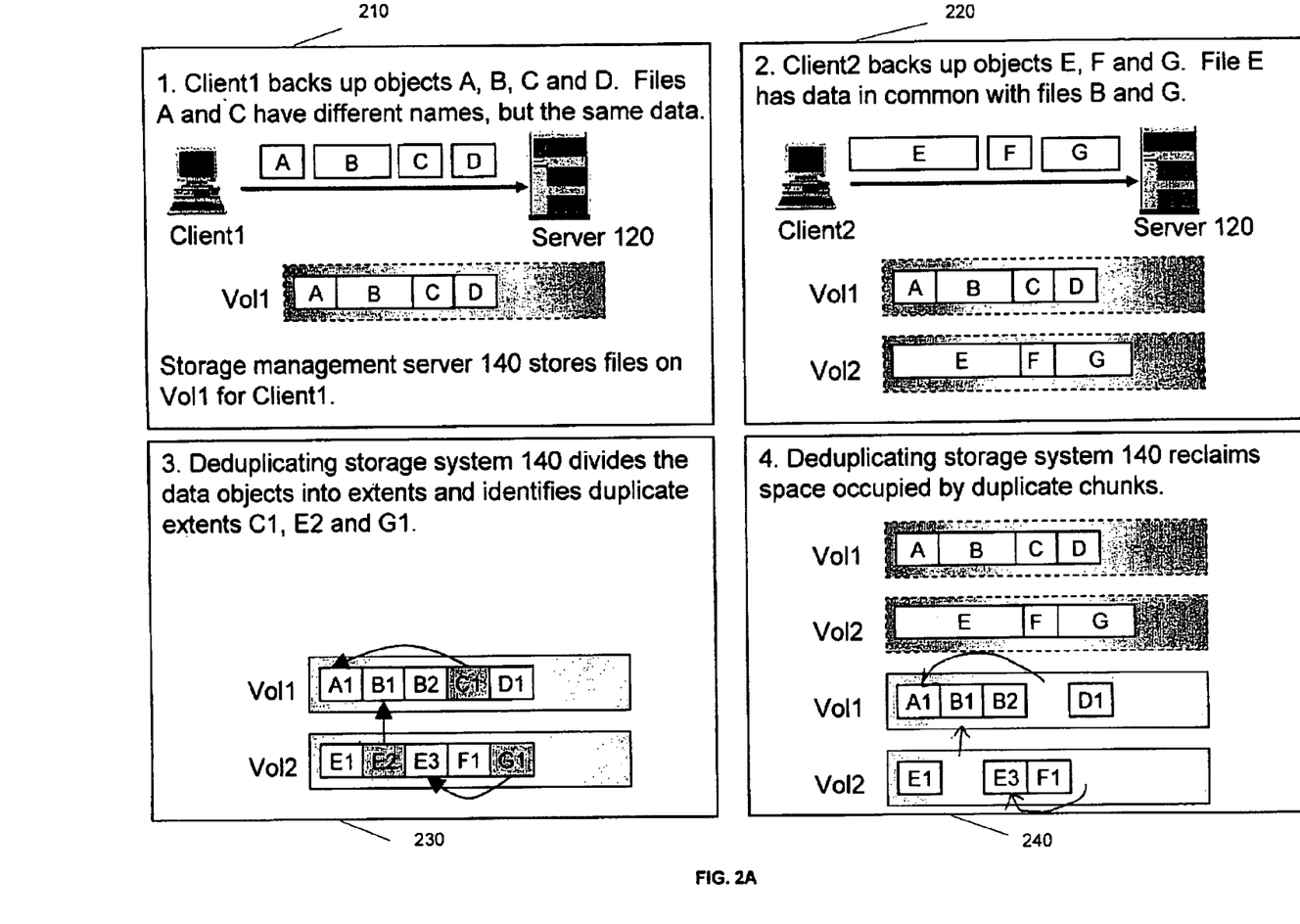
FIGS. 2A and 2B illustrate an example of processing performed by a storage-management server and a deduplicating storage system in accordance with certain embodiments.
Figure 2B:
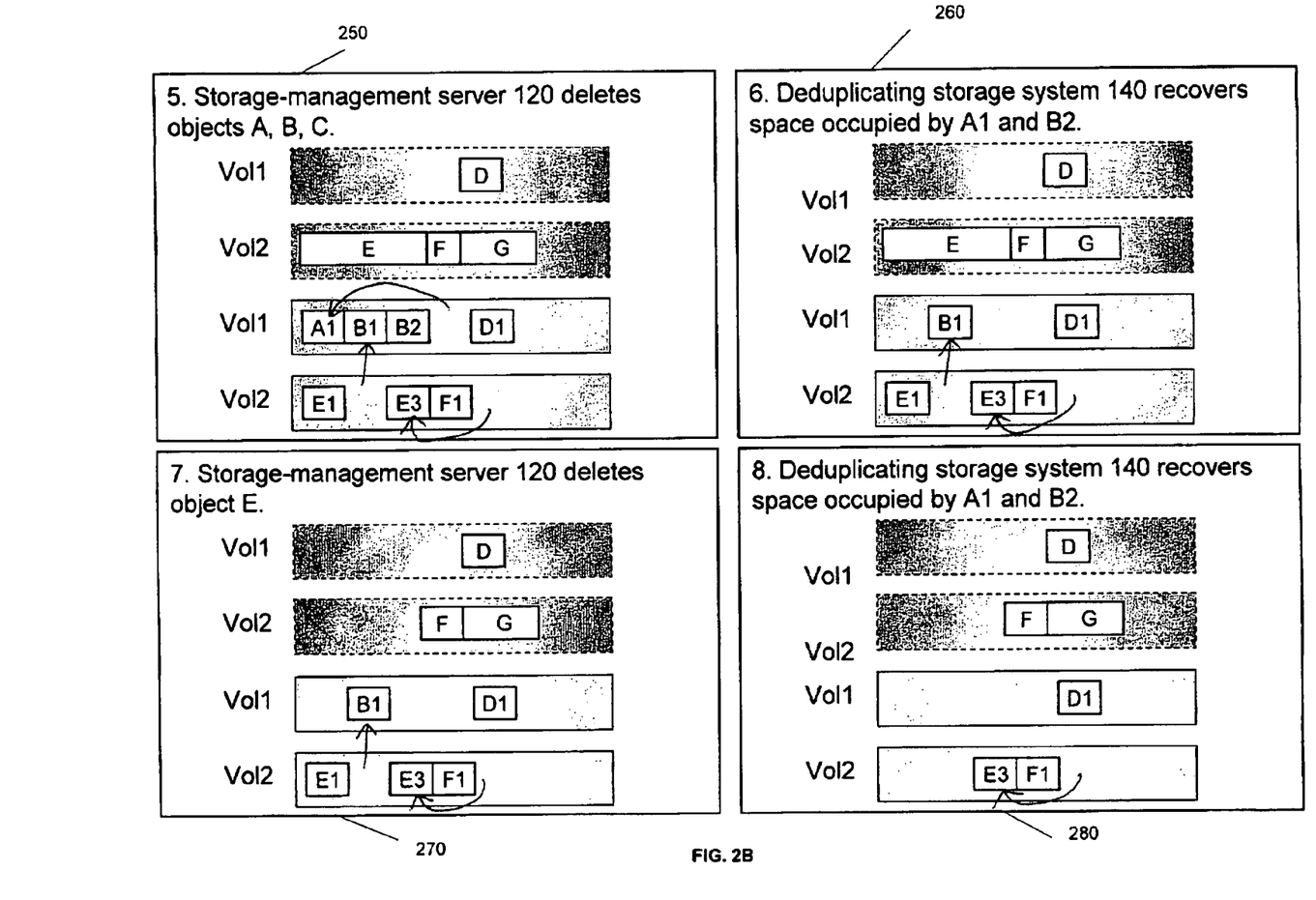

FIGS. 2A and 2B illustrate an example of processing performed by the storage-management server 120 and the deduplicating storage system 140 in accordance with certain embodiments. In FIGS. 2A and 2B, the logical storage volumes with dashed (" - - - ") lines represent the view as seen from the storage-management server 120, and the logical storage volumes with solid lines represent the view as seen from the deduplicating storage system 140.

In FIG. 2A, block 210, Client1 backs up data objects (e.g., files) A, B, C, and D to the storage-management server 120. The storage-management server 120 stores these data objects in a logical storage volume, Vol1, and creates database entries in the data object metadata 174 to track metadata about the data objects, including their storage locations. The storage for Vol1 is in the deduplicating storage system 140.

In block 220, Client2 backs up data objects (e.g., files) E, F, and G to the storage-management server 120. The storage-management server 120 stores these data objects in a logical storage volume, Vol2, and creates database entries in the data object metadata 174 to track metadata about the data objects, including their storage locations. The storage for Vol2 is in the deduplicating storage system 140.

In block 230, at some point in time, the deduplicating storage system 140 divides the data objects into extents. This could occur in-band (as the data objects are ingested by the storage-management server 120 and stored in the data storage 130) or out-of-band (after the data objects are ingested). The deduplicating storage system 140 also identifies identical extents. In certain embodiments, each extent is hashed (with a hash function) to produce an identifier, and different extents with the same identifiers are determined to be redundant. In such embodiments, an index may be maintained that stores the extent identifiers, and, when an identifier is hashed for a new extent, the index is used to determine whether that new extent is a duplicate of one already stored. In block 230, the deduplicating storage system 140 has determined that extent C1 is a duplicate of extent A1, that extent E2 is a duplicate of extent B1, and that extent G1 is a duplicate of extent E3.

In block 240, the deduplicating storage system 140 recovers space occupied by duplicate extents. In certain embodiments, this is done by exploiting sparse files, such that the space occupied by the duplicate extents is nulled out. In certain alternate embodiments, each extent is stored as a separate file, and space is recovered by deleting the files corresponding to the duplicate extents. In particular, in block 240, the deduplicating storage system 140 recovers physical space for extent C1, extent E2, and extent G1.

In block 250, the storage-management server 120 logically deletes data objects A, B, and C, which means that the storage-management server 120 removes references to these data objects from the data object metadata 174. The storage-management server 120 also notifies the deduplicating storage system 140 that the storage locations occupied by these data objects are no longer in use.

In block 260, the deduplicating storage system 140 recovers physical space occupied by extents A1 and B2 because these are no longer needed (i.e., there are no references to extents A1 and B2). The deduplicating storage system 140 does not recover space occupied by extent B1, because extent B1 is still referenced by extent E2.

In block 270, the storage-management server 120 deletes data object E, which means that the storage-management server 120 removes references to this data object from the data object metadata 174. The storage-management server 120 also notifies the deduplicating storage system that the storage locations occupied by this data object are no longer in use.

In block 280, the deduplicating storage system 140 recovers space occupied by extent B1 because that extent is no longer referenced by extent E2. The deduplicating storage system 140 also recovers space occupied by extent E1, but the deduplication storage system 140 does not recover space occupied by extent E3, because extent E3 is still referenced by extent G1.

Figure 3:
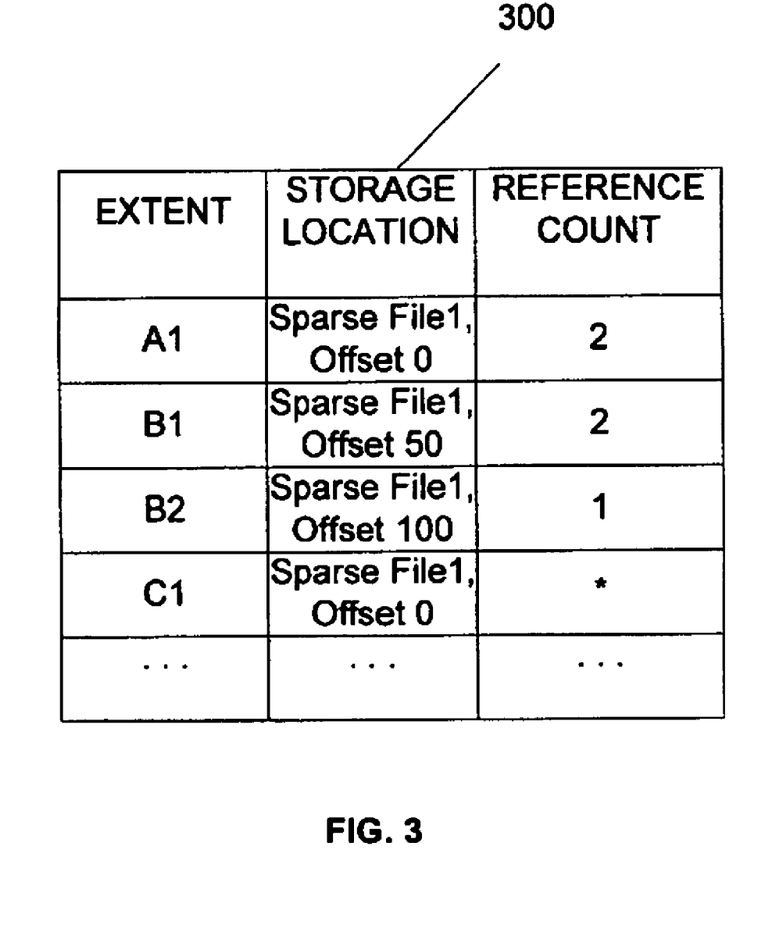
FIG. 3 illustrates a sample index for extents in accordance with certain embodiments.

FIG. 3 illustrates a sample index 300 for extents in accordance with certain embodiments. The index 300 may be implemented using a database, flat files or other data store. Index 300 is maintained by the deduplicating storage system 140. Index 300 is a table with a column for an extent identifier, a column for a storage location, and a column for a reference count. The storage location specifies a sparse file and an offset in the sparse file at which the associated extent begins. The reference count includes one for the extent itself (assuming the extent is still in use) and an additional one for each extent that references the common extent. For example, with reference to block 230 of FIG. 2A, extent A1 has a reference count of two for extent A1 and extent C1, which references extent A1. Similarly, extent B1 has a reference count of two for extent B1 and extent E2, which references extent B1. Extent C1 has the same storage location as extent A1 (sparse file1, offset zero) and has a special indicator (an asterisk in this example) in the reference count column. The special indicator indicates that extent C1 is a duplicate of another extent (i.e., extent A1) and points to a copy of the extent that is stored (i.e., points to extent A1). The ellipses indicate that there are other rows in the index 300 for other extents. Also, there may be other columns in the index 300 than those shown.

With reference to block 230 of FIG. 2A, if extent C1 is deleted, the reference count for extent A1 is decremented to one, but extent A1 is not deleted because extent A1 is still in use. If extent A1 is later deleted, the reference count for extent A1 is decremented to zero, and the physical space occupied by extent A1 becomes eligible for deallocation.

Figure 4:
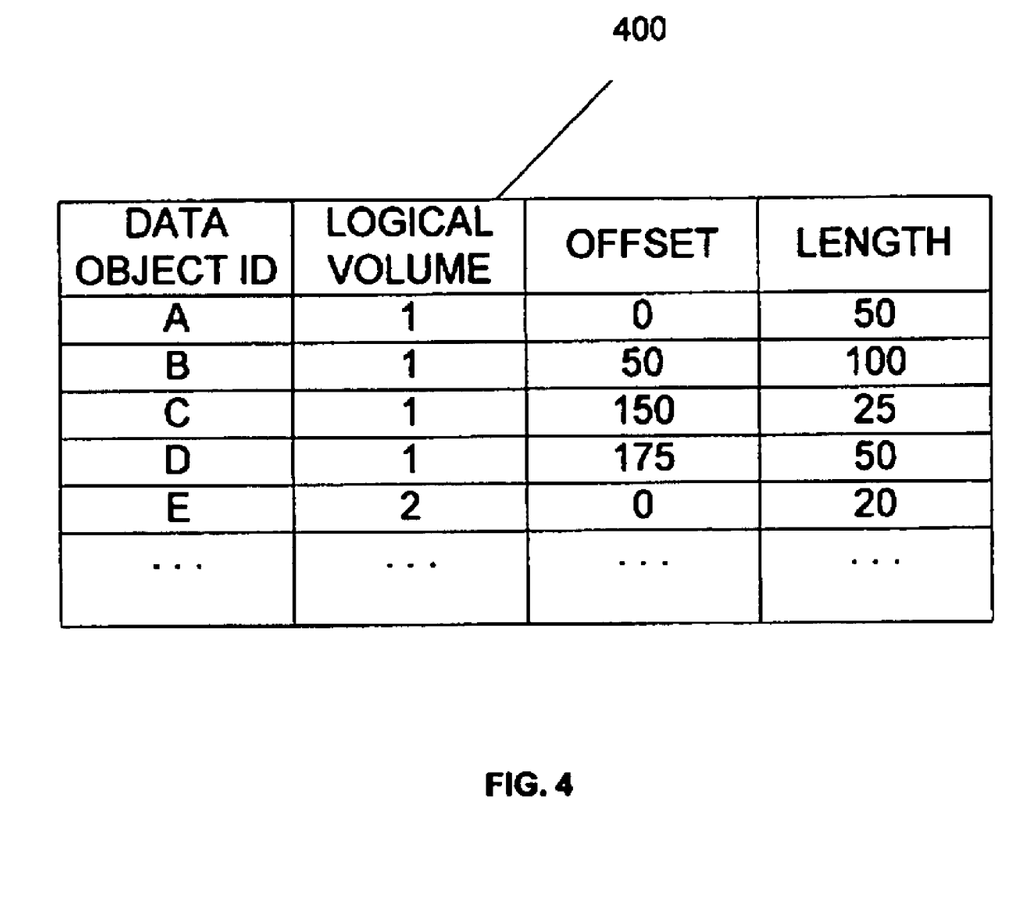
FIG. 4 illustrates sample data object metadata in accordance with certain embodiments.

FIG. 4 illustrates sample data object metadata 400 in accordance with certain embodiments. The storage-management server 120 maintains the data object metadata 400. The data object metadata 400 is a table with a column for a data object identifier (ID), a column for a logical storage volume, a column for an offset, and a column for a length. For example, with reference to block 220 of FIG. 2A, data object A is stored in logical storage volume 1, at an offset of zero, and has a length of 50. The ellipses indicate that there are other rows in the data object metadata 400 for other data objects. Also, there may be other columns in the data object metadata 400 than those shown.

Figure 5:
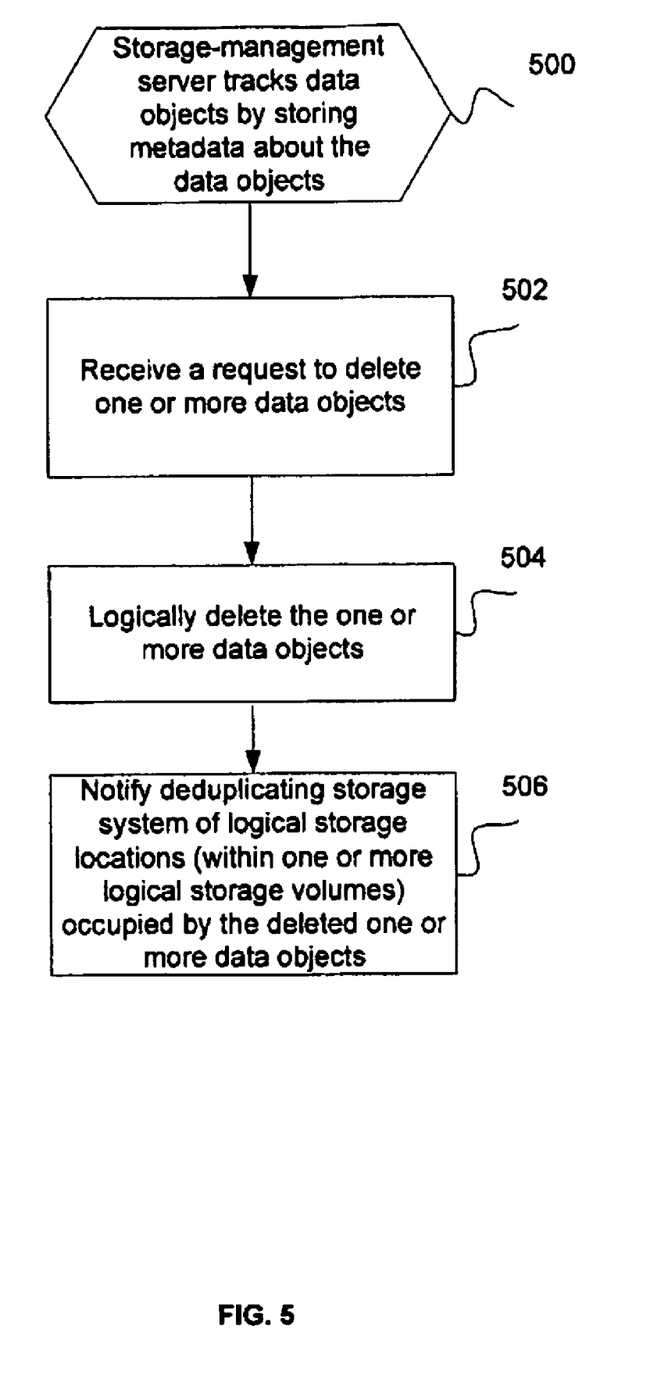
FIG. 5 illustrates logic performed by a storage-management server for deleting data objects in accordance with certain embodiments.

FIG. 5 illustrates logic performed by the storage-management server 120 for deleting data objects in accordance with certain embodiments. Control begins at block 500 with storage-management server 120 tracking data objects 134 by storing data object metadata 174 about the data objects in the database 170. In block 502, the storage-management server 120 receives a request to delete one or more data objects 134 (e.g., from a client application 110). In block 504, the storage-management server 120 logically deletes the one or more data objects 134. The storage-management server 120 performs logical deletion by deleting the data object metadata 174 about the one or more data objects for which the request was received. This includes deletion of references to the deleted one or more data objects 134 by decrementing the reference count for each appropriate extent.

In block 506, the storage-management server 120 notifies the deduplicating storage system 140 of the logical storage locations (within one or more logical storage volumes) occupied by the deleted one or more data objects 134. Logical storage locations may be described as locations in logical storage volumes as known to the storage-management server 120. In certain embodiments, the storage-management server 120 provides offsets into logical storage volumes and lengths of data objects for which data object metadata 174 has been deleted.

Figure 6:
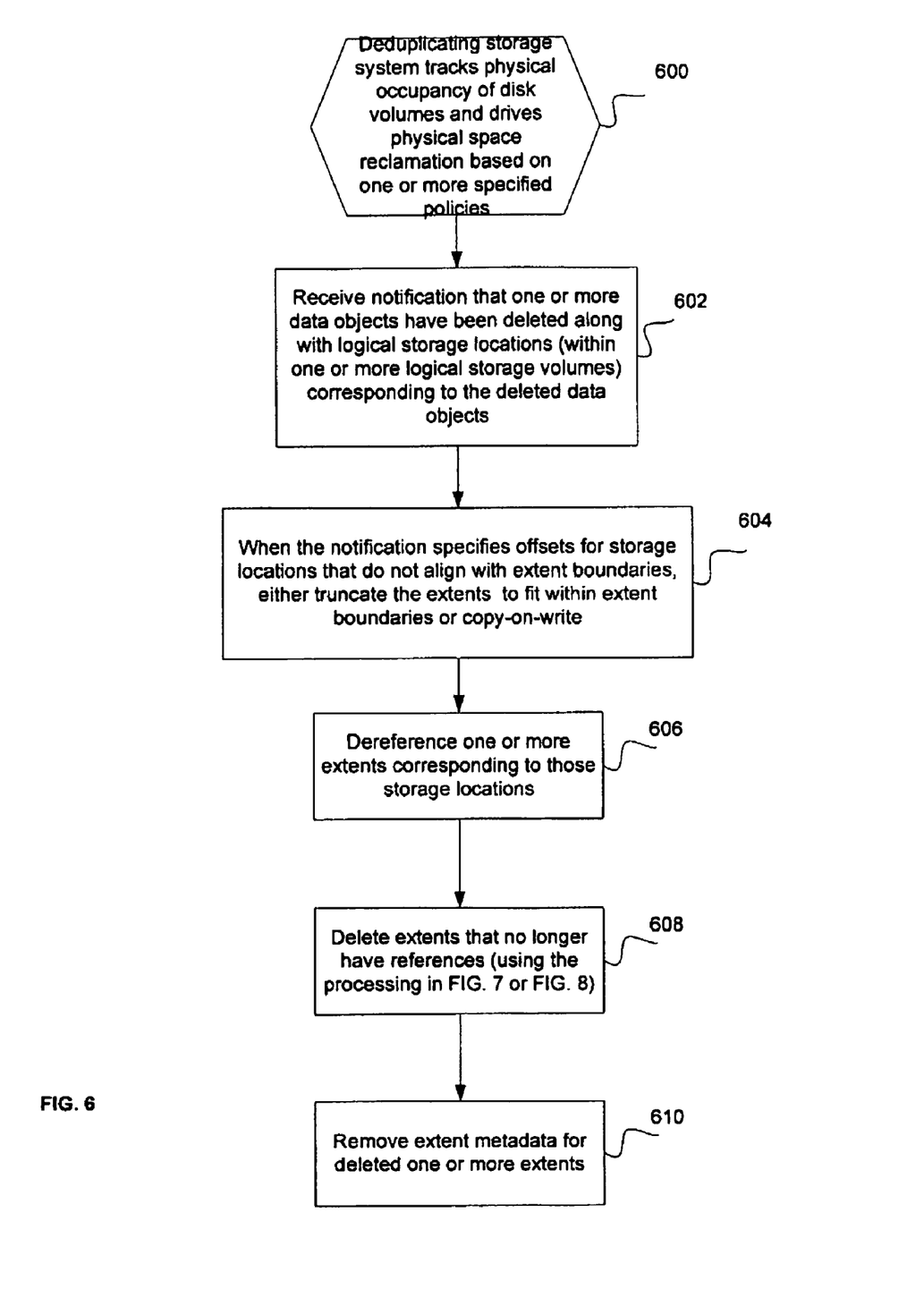
FIG. 6 illustrates logic performed by a deduplicating storage system for deleting extents in accordance with certain embodiments.

FIG. 6 illustrates logic performed by the deduplicating storage system 140 for deleting extents in according with certain embodiments. Control begins at block 600 with the deduplicating storage system 140 tracking occupancy of disk volumes and driving physical space reclamation based on one or more specified policies. In block 602, the deduplicating storage system 140 receives a notification from the storage-management server 120 that one or more data objects have been deleted along with logical storage locations (within one or more logical storage volumes) corresponding to the data objects for which metadata has been deleted. These logical storage locations map to physical storage that is no longer in use in the deduplicating storage system 140. In certain embodiments, the notification provides, for each data object, an offset into a logical storage volume and a length of the data object.

In block 604, when the storage-management server 120 specifies offsets for storage locations that do not align with extent boundaries, the extents that span these boundaries are either truncated to fit within a boundary or copied-on-write, depending upon deduplication reference counts. The basic principle of copy-on-write is that multiple entities use storage that happens to be identical. Therefore, rather than storing copies for each entity that references the common storage, a single instance is stored, and each entity points to the common storage. If one of the entities tries to change the storage, the storage cannot simply be modified because that would cause the contents to change for the other referencing entities. Instead, when an entity tries to change the contents of the shared storage, a new and private instance is created so that the entity can change the private instance without affecting other entities that reference the shared storage. With embodiments, if more than one extent references a common extent and the storage to be deleted does not line up with extent boundaries, it is possible to preserve the original extent, but also create a new, truncated extent for the data object that is to reference the shorter extent.

In block 606, the deduplicating storage system 140 dereferences one or more extents corresponding to those storage locations. In certain embodiments, the dereferencing is done by maintaining a reference count of the number of references to each extent (which includes one for the extent itself) and decrementing the reference count for each extent corresponding to a deleted extent. In block 608, the deduplicating storage system 140 deletes extents that no longer have references using the processing in either FIG. 7 or FIG. 8 (described below). In block 610, the deduplicating storage system 140 removes extent metadata 144 for the deleted one or more extents.

Figure 7:
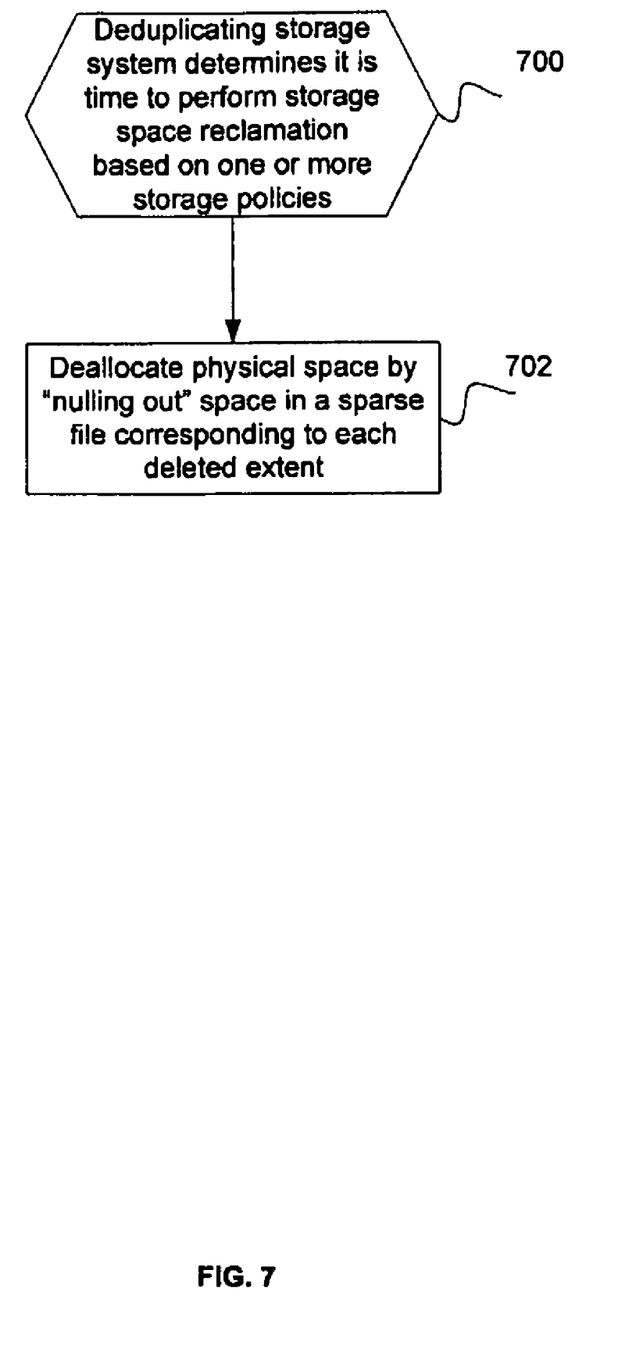
FIG. 7 illustrates physical space reclamation by a deduplicating storage system in accordance with certain embodiments.
Figure 8:
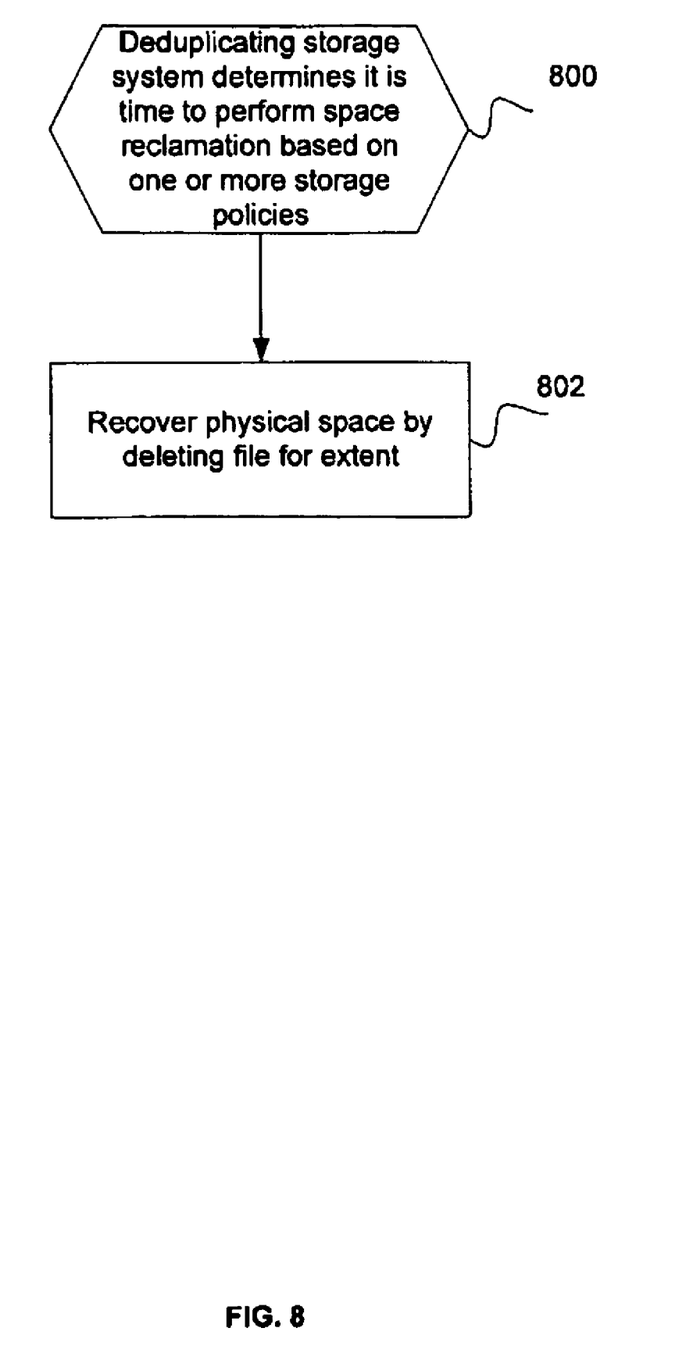
FIG. 8 illustrates physical space reclamation by a deduplicating storage system in accordance with certain alternative embodiments.

In certain alternative embodiments, the processing of block 610 occurs before the processing of block 608, with a record being kept of the extents that need to be deleted with the processing of FIG. 7 or FIG. 8.

The deduplicating storage system 140 drives physical space reclamation based on one or more specified policies. For example, a policy may state that unused space should be recovered immediately or when the unused space reaches a specified threshold. Once all the references to an extent have been removed (i.e., there are no references to that extent), that extent is eligible for physical space recovery, according to one or more policies.

FIG. 7 illustrates physical space reclamation by the deduplicating storage system 140 in accordance with certain embodiments. Control begins at block 700 with the deduplicating storage system 140 determining that it is time to perform space reclamation based on one or more storage policies. In block 702, the deduplicating storage system 140 deallocates physical space by "nulling out" storage locations in a sparse file 142 corresponding to each deleted extent. The step of nulling out may be file-system dependent. Some file systems with sparse-file capability provide an interface that can be used to indicate portions of the file that are no longer needed and can be deallocated. Through such an interface, the deduplicating storage system 140 is able to create holes in the file to recover space. For other file systems, remaining extents are copied to a new sparse file, seeking past unused extents, so as to preserve offsets.

FIG. 8 illustrates physical space reclamation by the deduplicating storage system 140 in accordance with certain alternative embodiments. In these embodiments, each extent is stored as a file in a file system. Control begins at block 800 with the deduplicating storage system 140 determining that it is time to perform space reclamation based on one or more storage policies. In block 802, the deduplicating storage system 140 deletes the file corresponding to an extent to recover space.

Embodiments operate in a system with a storage-management server 120 and a separate deduplicating storage system 140 that performs deduplication.

Thus, with embodiments, space is recovered from either or both of the following: (1) logical deletion of data objects or (2) extent deallocation during post-ingest deduplication. Regardless of the need for space recovery, space recovery is achieved with minimal data movement. Space recovery driven by the deduplicating storage system 140 due to extent deallocation does not force updates to storage location information in the storage-management server 120. Logical space reclamation by the storage-management server 120 does not redrive deduplication in the deduplicating storage system 140. Space recovery is integrated between the storage-management server 120 and the deduplicating storage system 140, avoiding separate mechanisms at each level.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may comprise a receiver or transmitter device or other physical carrier capable of processing or implementing the code as "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer usable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 5-8 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 5-8 may be implemented in software, hardware, programmable and non-programmable gate array logic or in some combination of hardware, software, or gate array logic.

Figure 9:
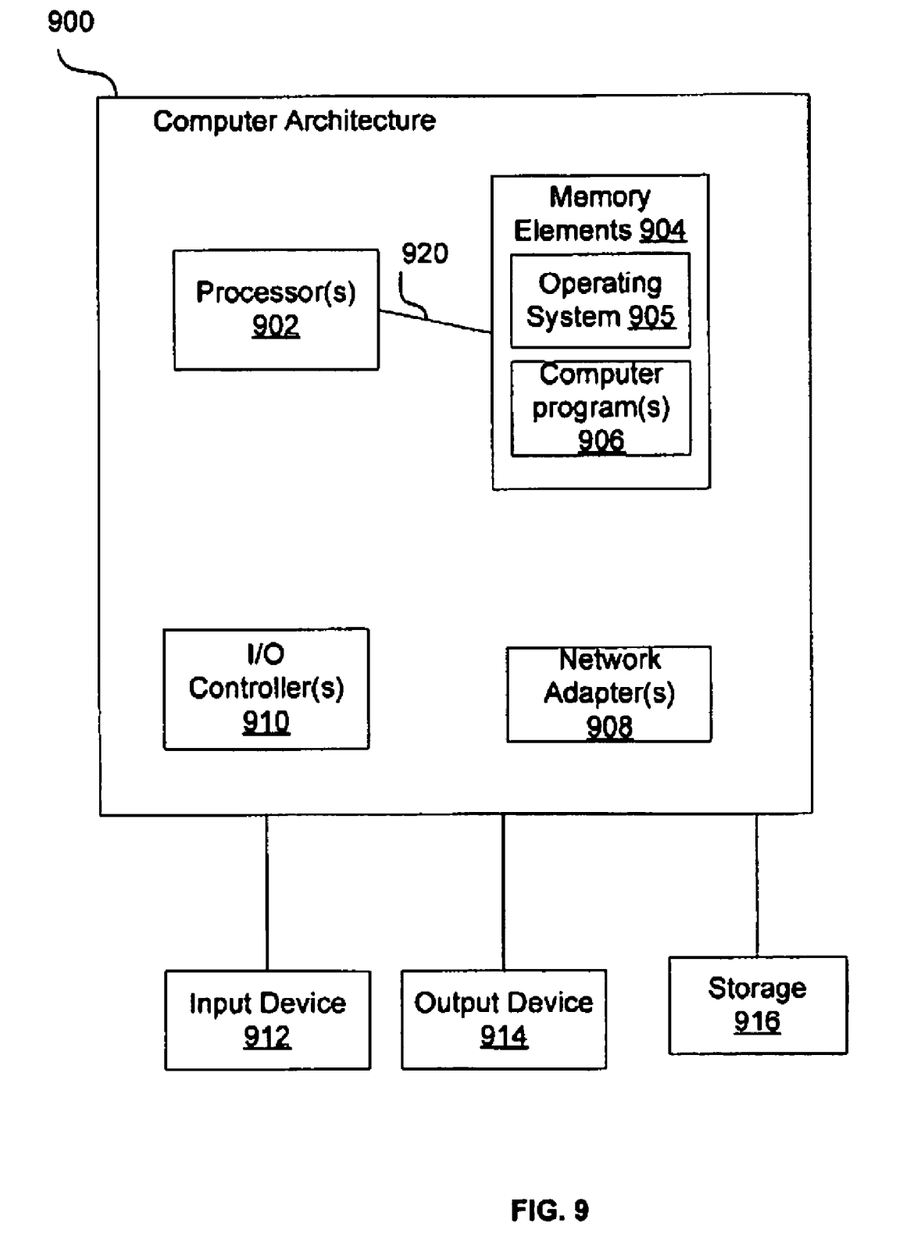
FIG. 9 illustrates a system architecture that may be used in accordance with certain embodiments.

FIG. 9 illustrates a system architecture 900 that may be used in accordance with certain embodiments. Client computer 100 and/or storage-management server 120 may implement system architecture 900. The system architecture 900 is suitable for storing and/or executing program code and includes at least one processor 902 coupled directly or indirectly to memory elements 904 through a system bus 920. The memory elements 904 may include local memory employed during actual execution of the program code, bulk storage, and cache memories which provide temporary storage of at least some program code in order to reduce the number of times code must be retrieved from bulk storage during execution. The memory elements 904 include an operating system 905 and one or more computer programs 906.

Input/Output (I/O) devices 912, 914 (including but not limited to keyboards, displays, pointing devices, etc.) may be coupled to the system either directly or through intervening I/O controllers 910.

Network adapters 908 may also be coupled to the system to enable the data processing system to become coupled to other data processing systems or remote printers or storage devices through intervening private or public networks. Modems, cable modem and Ethernet cards are just a few of the currently available types of network adapters 908.

The system architecture 900 may be coupled to storage 916 (e.g., a non-volatile storage area, such as magnetic disk drives, optical disk drives, a tape drive, etc.). The storage 916 may comprise an internal storage device or an attached or network accessible storage. Computer programs 906 in storage 916 may be loaded into the memory elements 904 and executed by a processor 902 in a manner known in the art.

The system architecture 900 may include fewer components than illustrated, additional components not illustrated herein, or some combination of the components illustrated and additional components. The system architecture 900 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method, comprising:
   under control of a storage-management server,
      storing metadata about data objects in a database;
      in response to a request to delete one or more data objects stored in data storage, logically deleting the one or more data objects by deleting the metadata about the one or more data objects in the database; and
      sending a notification that the one or more data objects have been logically deleted by deleting the metadata about the one or more data objects, wherein the notification provides storage locations within one or more logical storage volumes corresponding to the deleted one or more data objects, wherein each of the one or more data objects are divided into one or more extents; and
   under control of a deduplicating storage system that is separate from and coupled to the storage-management server,
      receiving the notification; and
      in response to determining that a sparse file represents the one or more logical storage volumes, recovering the physical space occupied by unused extents without moving data and without forcing updates to storage location information tracked by the storage-management server by nulling out space in the sparse file corresponding to each of the one or more extents.

2. The computer-implemented method of claim 1, at the storage-management server, further comprising:
tracking the one or more data objects by storing the metadata about the data objects;
receiving a request to delete the one or more data objects;
logically deleting the one or more data objects by deleting the metadata about the one or more data objects; and
in response to logically deleting the one or more data objects, sending the notification of one or more storage locations occupied by the one or more data objects, wherein each storage location provides an offset into a logical storage volume and a length of a data object.

3. The computer-implemented method of claim 1, at the deduplicating storage system, further comprising:
dereferencing the one or more extents corresponding to the storage locations by maintaining a reference count of a number of references to each extent and decrementing the reference count for each extent corresponding to a deleted extent, wherein an extent is eligible for space reclamation when the references to the extent have been removed.

4. The computer-implemented method of claim 1, at the deduplicating storage system, further comprising:
in response to determining that there is one file for each extent, recovering physical space by deleting the file corresponding to the extent.

5. The computer-implemented method of claim 1, at the deduplicating storage system, further comprising:
in response to determining that the notification specifies offsets for storage locations that do not align with extent boundaries, performing one of truncating the one or more extents to fit within the extent boundaries and copying-on-write.

6. The computer-implemented method of claim 1, at the deduplicating storage system, further comprising:
removing extent metadata for the one or more extents.

7. The method of claim 1, at the deduplicating storage system, further comprising:
determining that it is time to perform storage space reclamation based on one or more storage policies.

8. A computer program product, comprising a:
a first computer-readable medium storing a first computer readable program, wherein the first computer-readable medium is a member of a set of computer readable media consisting of a semiconductor or solid state memory, a magnetic tape, a removable computer diskette, a rigid magnetic disk, an optical disk, a magnetic storage medium, and volatile and non-volatile memory devices, and wherein the first computer readable program, when executed, causes a storage-management server to:
store metadata about data objects in a database;
in response to a request to delete one or more data objects stored in data storage, logically delete the one or more data objects by deleting the metadata about the one or more data objects in the database; and
send a notification that the one or more data objects have been logically deleted by deleting the metadata about the one or more data objects, wherein the notification provides storage locations within one or more logical storage volumes corresponding to the deleted one or more data objects, wherein each of the one or more data objects are divided into one or more extents; and
a second computer-readable medium storing a second computer readable program, wherein the second computer readable program, when executed, causes a deduplicating storage system, that is separate from and coupled to the storage-management server, to:
receive the notification; and
in response to determining that a sparse file represents the one or more logical storage volumes, recover the physical space occupied by unused extents without moving data and without forcing updates to storage location information tracked by the storage-management server by nulling out space in the sparse file corresponding to each of the one or more extents.

9. The computer program product of claim 8, wherein the first computer readable program when executed causes the storage-management server to:
track the one or more data objects by storing the metadata about the data objects;
receive a request to delete the one or more data objects;
logically delete the one or more data objects by deleting the metadata about the one or more data objects; and
in response to logically deleting the one or more data objects, send the notification of one or more storage locations occupied by the one or more data objects, wherein each storage location provides an offset into a logical storage volume and a length of a data object.

10. The computer program product of claim 8, wherein the second computer readable program when executed causes the deduplicating storage system to:
dereference the one or more extents corresponding to the storage locations by maintaining a reference count of a number of references to each extent and decrementing the reference count for each extent corresponding to a deleted extent, wherein an extent is eligible for space reclamation when the references to the extent have been removed.

11. The computer program product of claim 8, wherein the second computer readable program when executed causes the deduplicating storage system to:
in response to determining that there is one file for each extent, recover physical space by deleting the file corresponding to the extent.

12. The computer program product of claim 8, wherein the second computer readable program when executed causes the deduplicating storage system to:
in response to determining that the notification specifies offsets for storage locations that do not align with extent boundaries, perform one of truncating the one or more extents to fit within the extent boundaries and copying-on-write.

13. The computer program product of claim 8, wherein the second computer readable program when executed causes the deduplicating storage system to:
remove extent metadata for the one or more extents.

14. A system, comprising:
hardware logic at a storage-management server performing operations, the operations comprising:
storing metadata about data objects in a database;
in response to a request to delete one or more data objects stored in data storage, logically deleting the one or more data objects by deleting the metadata about the one or more data objects in the database; and
sending a notification that the one or more data objects have been logically deleted by deleting the metadata about the one or more data objects, wherein the notification provides storage locations within one or more logical storage volumes corresponding to the deleted one or more data objects, wherein each of the one or more data objects are divided into one or more extents; and hardware logic at a deduplicating storage system, that is separate from and coupled to the storage-management server, performing operations, the operations comprising:

receiving the notification; and in response to determining that a sparse file represents the one or more logical storage volumes, recovering the physical space occupied by unused extents without moving data and without forcing updates to storage location information tracked by the storage-management server by nulling out space in the sparse file corresponding to each of the one or more extents.

15. The system of claim 14, wherein the operations at the storage-management server further comprise:

tracking the one or more data objects by storing the metadata about the data objects;

receiving a request to delete the one or more data objects;

logically deleting the one or more data objects by deleting the metadata about the one or more data objects; and in response to logically deleting the one or more data objects, sending the notification of one or more storage locations occupied by the one or more data objects, wherein each storage location provides an offset into a logical storage volume and a length of a data object.

16. The system of claim 14, wherein the operations at the deduplicating storage system further comprise:

dereferencing the one or more extents corresponding to the storage locations by maintaining a reference count of a number of references to each extent and decrementing the reference count for each extent corresponding to a deleted extent, wherein an extent is eligible for space reclamation when the references to the extent have been removed.

17. The system of claim 14, wherein the operations at the deduplicating storage system further comprise:

in response to determining that there is one file for each extent, recovering physical space by deleting the file corresponding to the extent.

18. The system of claim 14, wherein the operations at the deduplicating storage system further comprise:

in response to determining that the notification specifies offsets for storage locations that do not align with extent boundaries, performing one of truncating the one or more extents to fit within the extent boundaries and copying-on-write.

19. The system of claim 14, wherein the operations at the deduplicating storage system further comprise:

removing extent metadata for the one or more extents.

* * * * *